United States Patent

Wiedenheft III et al.

[11] Patent Number: 5,905,211
[45] Date of Patent: May 18, 1999

[54] LOAD MONITOR SHEAVE

[75] Inventors: John H. Wiedenheft III, Norwich; Charles E. Gray, North Stonington, both of Conn.

[73] Assignee: The United States of America as represented by the Secretary of the Navy, Washington, D.C.

[21] Appl. No.: 08/990,264

[22] Filed: Dec. 15, 1997

[51] Int. Cl.[6] .................................................. G01L 5/04
[52] U.S. Cl. ................................. 73/862.44; 73/862.46; 73/862.391
[58] Field of Search ........................ 73/862.391, 862.44, 73/862.451, 862.46, 862.56, 862.57

[56] References Cited

U.S. PATENT DOCUMENTS

| | | | |
|---|---|---|---|
| 2,210,759 | 8/1940 | Hansen | 73/862.57 X |
| 3,330,154 | 7/1967 | Habern et al. | 73/862.44 X |
| 3,381,527 | 5/1968 | Grubbs | 73/862.46 |
| 3,558,104 | 1/1971 | McGinty | 73/862.44 X |
| 4,228,682 | 10/1980 | Decker et al. | 73/862.56 X |
| 4,372,535 | 2/1983 | Gibson et al. | 73/862.44 X |
| 4,413,691 | 11/1983 | Wetzel | 73/862.56 X |
| 4,503,921 | 3/1985 | Polen et al. | 73/862.56 X |
| 5,305,649 | 4/1994 | Larimore | 73/862.451 X |
| 5,559,294 | 9/1996 | Hoium et al. | 73/862.44 |

Primary Examiner—Elizabeth L. Dougherty
Attorney, Agent, or Firm—Michael J. McGowan; Prithvi C. Lall; Robert W. Gauthier

[57] ABSTRACT

A large diameter load monitor sheave is provided for measuring the tension on a cable. The sheave is rotatably mounted on a cantilevered, generally vertical, fixed axle. The cantilevered axle allows the cable to be looped over the sheave without having to thread the cable between axle supports. The lower end of the axle is attached to a plate which is bolted to a mating plate on a vertical rod. Slotted holes on the axle plate allow the tilt of the sheave to be adjusted. The length of the rod can be adjusted, thus adjusting the height of the sheave. The lower end of the rod is supported by a pin connection to a base plate. A collar surrounds the upper portion of the rod just below the plate connection and the collar is affixed to an upright member projecting from a mounting support. A tensile force on the cable is translated to a tensile force between the collar and the upright member which is measured by a load cell. The mounting support and upright member can be rotated about the longitudinal axis of the rod to maintain the resultant tensile force on the cable aligned with the load cell.

13 Claims, 3 Drawing Sheets

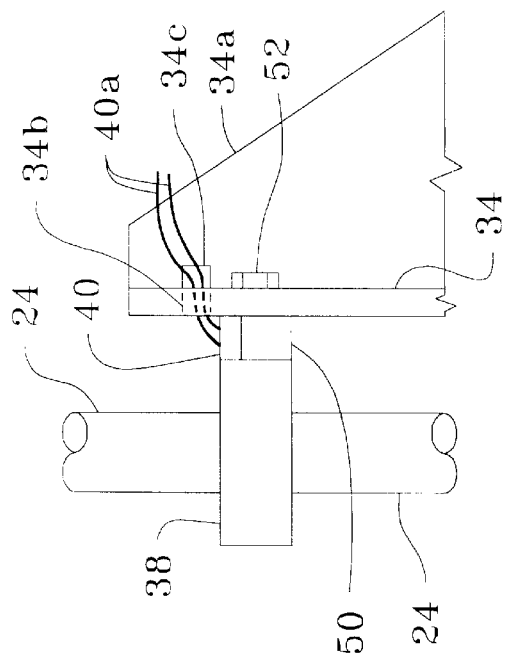
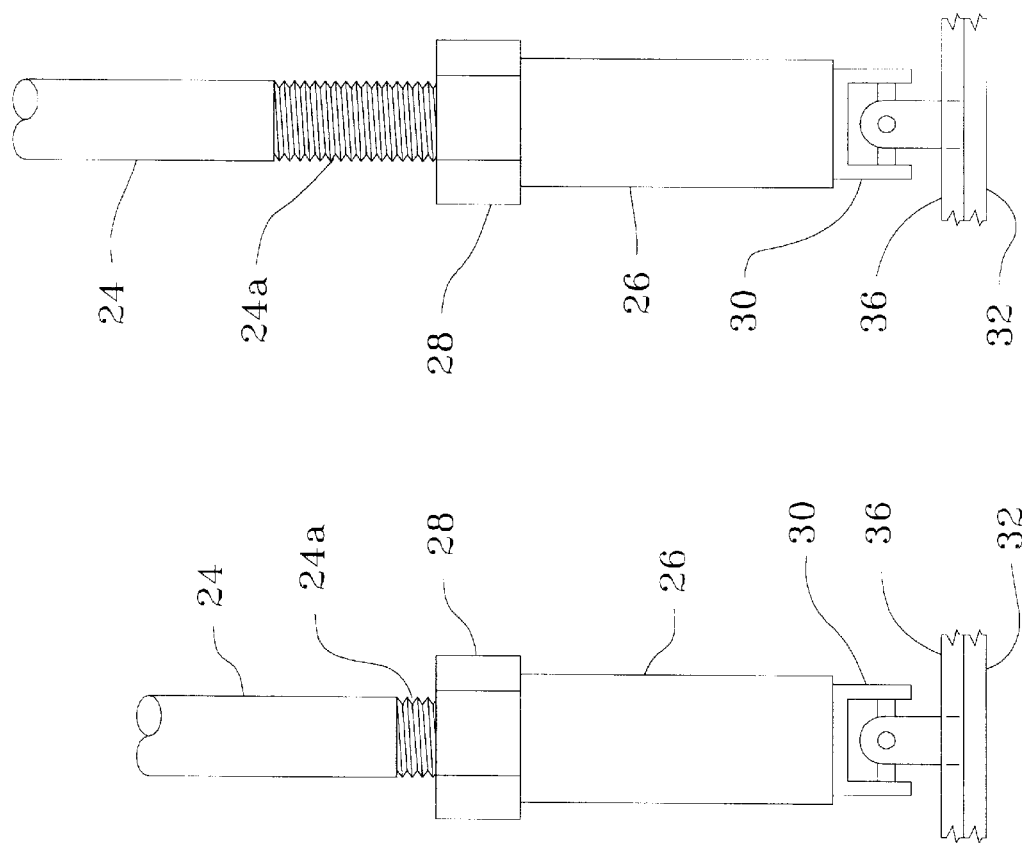
FIG. 4
FIG. 3b
FIG. 3a

LOAD MONITOR SHEAVE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a device for measuring tension on a cable, and more particularly to a cantilevered load monitor sheave having height, angle and tilt adjustments.

(2) Description of the Prior Art

The measurement of tensile load within a cable as it is pulled around a sheave is a common component of cable testing. Various load measuring devices are well known in the art. U.S. Pat. No. 5,365,797 to McCrory, III, employs a split pulley with one end of the split being hinged and the other end allowed to open or close. A rope or cable is wrapped about the pulley and tension applied to the rope or cable causes the open end of the split pulley to begin to close. The amount of closure is measured using a strain gauge load cell and is proportional to the tensile load applied to the rope or cable. Many prior art devices operate on this general principle of measuring strain occurring in a member as a result of a load applied to the member. U.S. Pat. No. 3,248,937 to Vincent provides a revolving drum on a frame. A pawl mounted on the frame engages the drum. Tension on a line wrapped around the drum tries to rotate the drum against the pawl. A strain sensitive means is attached to the pawl and measures the dimensional change or compression of the pawl resulting from the load applied against the pawl by the drum. The amount of compression is proportional to the tension on the line.

The testing of sonar array cables presents a unique set of challenges in testing tension in the cable as it is pulled about a sheave. Due to the large bend radius of the cables, the sheave must have a minimum radius of 18 inches. Fabrication of a sonar array cable is accomplished with the full length of the cable laid out and testing is carried out on various sections of the cable. The sections of the cable are tested independently such that the cable is not put onto a reel until all sections have been tested. Therefor it is necessary to be able to test a section of the cable without threading the cable around the sheave. Rather, the apparatus must allow the cable to be looped over the sheave. As a result of fabrication methods and testing requirements, the height of the sheave and the tilt of the sheave axis must be adjustable. Further, the direction of the resultant tensile loading can vary from section to section, requiring the test apparatus to accommodate these angular changes. None of the prior art load monitoring sheaves provide the ability to loop the cable over the sheave combined with the necessary height, tilt and angular adjustments.

SUMMARY OF THE INVENTION

Accordingly, it is an object of the present invention to provide a load monitor sheave for measuring the tension on a cable with a large bend radius.

Another object of the present invention is to provide a load monitor sheave for measuring the tension on sections of a cable where the sections of the cable are looped onto the sheave.

Still another object of the present invention is to provide a load monitor sheave for measuring the tension on sections of a cable where the sheave is adjustable in height and tilt of the sheave axis.

A still further object is to provide a load monitor sheave for measuring the tension on a cable where the angle of the resultant tensile force applied to the cable can be adjusted.

Other objects and advantages of the present invention will become more obvious hereinafter in the specification and drawings.

In accordance with the present invention, a large diameter load monitor sheave is provided for measuring the tension on a cable with the sheave mounted on a cantilevered, fixed axle. The sheave has a center bearing which allows the sheave to rotate a about the fixed axle. The cantilevered axle allows the cable to be looped over the sheave without having to thread the cable between axle supports, thus allowing ease of access for separately testing various sections of the cable. The lower end of the axle is attached to a plate which is connected to a mating plate on a vertical rod. The rod is supported by a pin connection to a base. A collar surrounds the upper portion of the rod just below the plate connection. The collar is affixed to an upright member projecting from a mounting support. Tensile forces on the cable are translated to a tensile force between the collar and the upright member. A load cell is attached at the connection between the collar and the upright member to measure the tensile strain between the collar and the upright member. With the sheave in the horizontal position, the weight of the sheave is carried by the pin connection at the lower end of the axle such that the load cell measures only the strain caused by the tension on the cable. The rod has a threaded portion for adjusting the height of the sheave. The rod slides within the collar to allow the sheave height adjustment. The axle plate and mating rod plate are bolted together, with the axle plate having slotted holes allowing the tilt of the sheave to be adjusted. In addition, the mounting support and upright member can be rotated about the longitudinal axis of the rod to maintain the resultant tensile force on the cable aligned with the load cell at the collar and upright member connection. Once the alignment is adjusted, the mounting support is securely clamped to the base.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein:

FIGS. 3a and 3b are detailed views of the height adjustment of the load monitor sheave of the present invention; and FIG. 4 is a detailed side view of the tensile load measuring device of the load monitor sheave of the present invention.

DESCRIPTION OF THE PREFERRED EMBODIMENT

Figure 1:
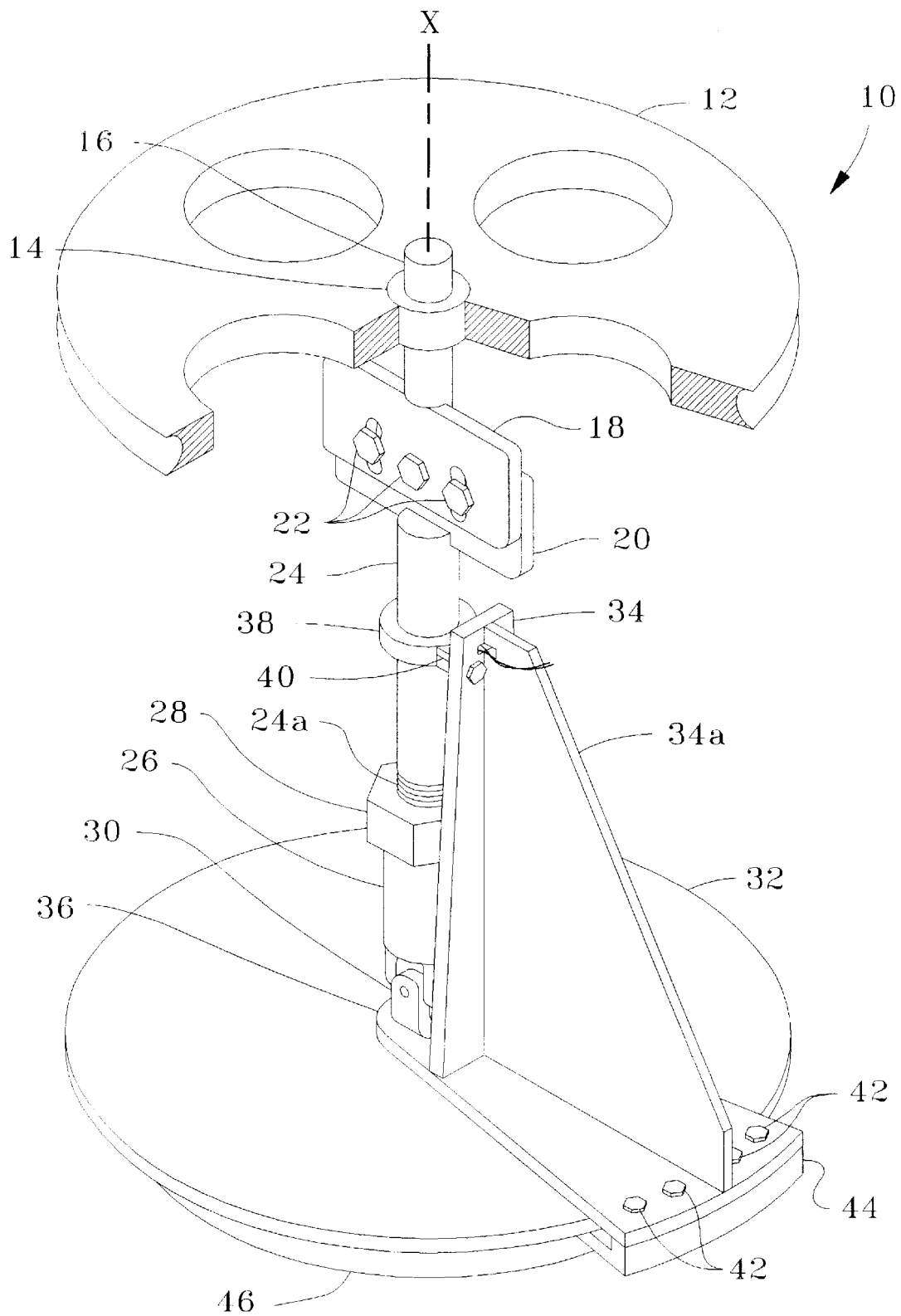
FIG. 1 is a cut away isometric view of the load monitor sheave of the present invention.

Referring now to FIG. 1, there is shown a cut away isometric view of load monitor sheave 10. Sheave 12 rotates on bearing 14 about fixed axle 16. Axle 16 is fixed to axle plate 18. Axle plate 18 is connected to mating plate 20 by bolts 22. It is noted that axis X-X of axle 16 lies on the plane formed between axle plate 18 and mating plate 20. Rod 24 is fixed to mating plate 20 and is coaxial with axle 16. The lower end 24a of rod 24 is threaded into sleeve 26. Locking nut 28 is threaded onto lower end 24a of rod 24 and is tightened against sleeve 26 to fix the extension of rod 24 from sleeve 26. As with rod 24, sleeve 26 is coaxial with axle 16. Pin connection 30 supports sleeve 26 on base plate 32. Upright member 34 is fixed to and extends from mounting support 36 adjacent sleeve 26 and rod 24. Flange 34a provides support for upright member 34. Collar 38 is placed on rod 24 and attached to upright member 34. Collar 38 securely holds rod 24, but allows for rotation of rod 24 about axis X-X and allows for movement of rod 24 along axis X-X. Load cell 40 is placed at the connection of collar 38 to upright member 34. When a cable (not shown) is looped over sheave 12 and a tensile force is applied on the cable, the load is transferred to mounting support 36 and upright member 34 by pin connection 30 and collar 38, respectively. Load cell 40 provides a measurement of the strain at the connection between collar 38 and upright member 34 and thus provides a measure of the tensile force applied to the cable. Mounting support 36 is rotatably attached to base plate 32, such that the resultant force on sheave 12 can be aligned with load cell 40. Once the resultant force is aligned with load cell 40, bolts 42 are used to tighten clamp 44 against base plate 32, thus preventing further rotation of mounting support 36. Base plate 32 is secured to base footing 46 which in turn is secured to any suitable foundation.

Figures 2A, 2B:
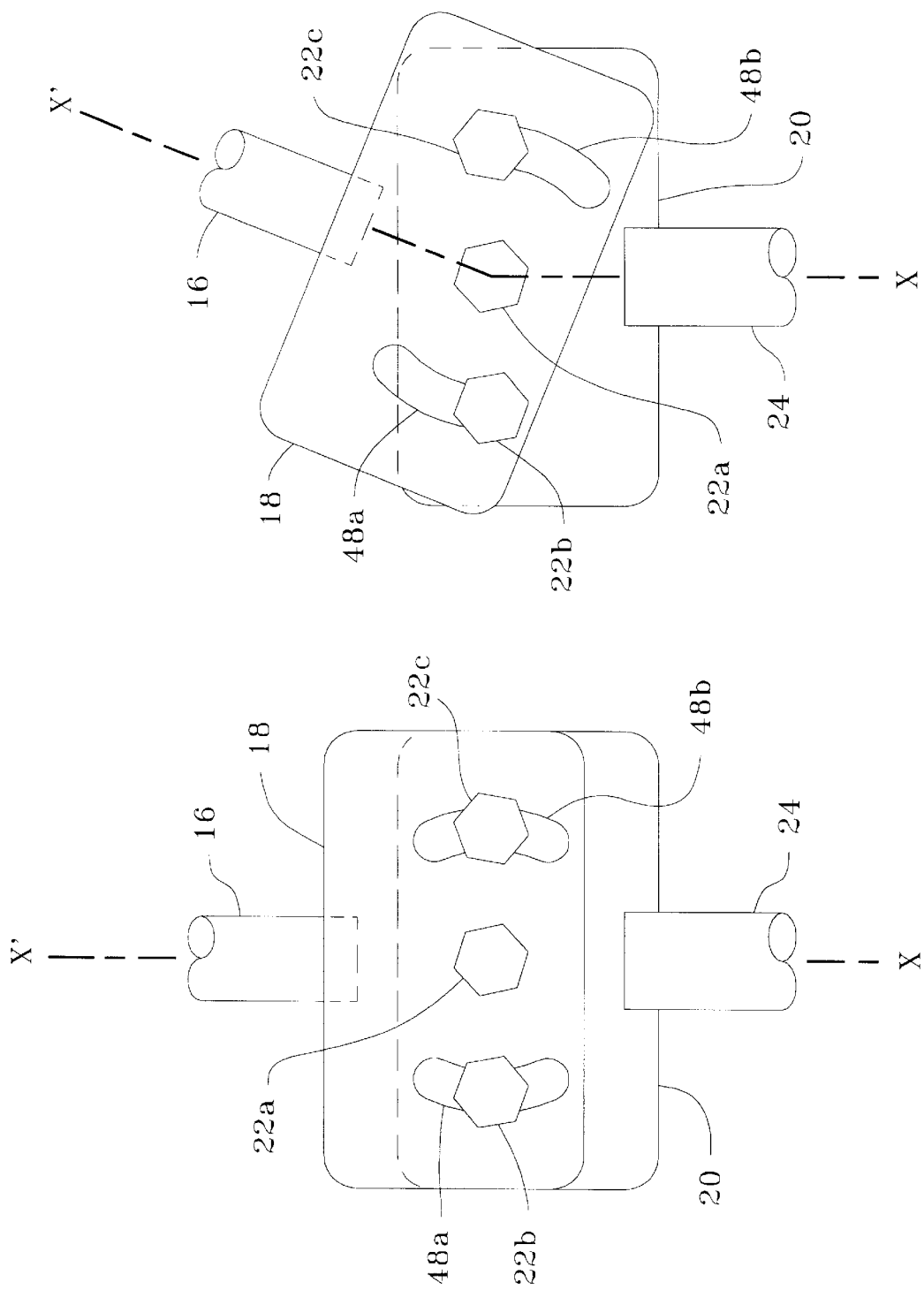
FIGS. 2a and 2b are detailed views of the tilt adjustment of the load monitor sheave of the present invention.

Referring now additionally to FIGS. 2a and 2b there are shown detail views of axle plate 18 and mating plate 20 illustrating how the tilt of sheave 12 with respect to axis X-X can be adjusted. FIG. 2a shows axis X-X of rod 24 and axis X'-X' of axle 16 in the aligned position corresponding to FIG. 1. Three bolts 22a–c connect axle plate 18 and mating plate 20. Central bolt 22a passes through plates 18 and 20 at the intersection of axes X-X and X'-X'. Bolts 22b and 22c pass through left and right arc shaped slots 48a and 48b in axle plate 18, respectively. To adjust the tilt of sheave 12, bolts 22a–c are loosened and axle plate 18 is pivoted about bolt 22a, as indicated in FIG. 2b, until the desired tilt is achieved. Slots 48a and 48b are shaped to accommodate the rotation of axle plate 18. Bolts 22a–c are then tightened to fix axle 16 and, correspondingly, sheave 12 in the tilted configuration.

Referring now additionally to FIGS. 3a and 3b, there are shown detailed views of rod 24 and sleeve 26 illustrating how the height of load monitor sheave 10 can be adjusted. Sleeve 26 is shown connected to mounting support 36 by pin connection 30, making the height of sleeve 26 fixed when sleeve 26 is in a vertical position as shown. FIG. 3a illustrates rod 24 in a lowered position, i.e., lower end 24a of rod 24 is threaded into sleeve 26. Locking nut 28 is threaded onto lower end 24a and tightened against sleeve 26 to maintain rod 24 at the lowered position. FIG. 3b illustrates rod 24 in an extended position, which increases the height of sheave 12 above base plate 32. To adjust the height, locking nut 28 is threaded away from sleeve 26 and rod 24 is threaded out from sleeve 26 until the desired height is reached. Locking nut 28 is again threaded onto lower end 24a of rod 24 and tightened against sleeve 26 to maintain rod 24 at the desired extension.

Referring now to FIG. 4, there is shown a detailed side view of collar 38 and load cell 40. Collar 38 fits slidably over rod 24 such that rod 24 can be extended or lowered as indicated in FIGS. 3a and 3b. Collar extension 50 protrudes from collar 38 and is firmly attached to upright member 34 by bolts 52. Load cell 40 is attached to collar extension 50 so as to measure strain within collar extension 50. Slots 34b and 34c are provided in upright member 34 and flange 34a, respectively, for passage of load cell wiring 40a.

The invention thus described is a load monitor sheave for measuring tension on a cable. A large diameter sheave is provided to accommodate cable with a large bend radius. The sheave is supported on a cantilevered axle such that the cable can be looped over the sheave rather than being threaded between axle supports. The axle is supported above a vertical rod. The axle and rod each have plates affixed at their adjacent ends such that connecting the plates to each other connects the axle to the rod. The plates are connected by three bolts. A central bolt passes through the intersection point of the axle and rod axes. The one bolt to either side of the central bolt passes through a slotted opening in one of the plates such that the axis of the axle can be tilted with respect to the axis of the rod. The end of the rod furthest from the axle is threaded and mates with a sleeve such that the height of rod can be varied by threading the rod into or out of the sleeve. A lock nut is threaded onto the rod and is tightened against the sleeve to maintain the chosen rod extension. The tilt and height adjustments allow testing of the cable under various axle support conditions found in field installations. The base of the sleeve is supported by a pin connection to a base plate. A collar is placed over the rod and is attached to an upright member extending from a mounting support. When a cable is placed on the sheave and a tensile load applied, the load is transferred to the base plate and upright member via the pin connection and the collar, respectively. A load cell is provided at the collar attachment to the upright member to measure the strain in the collar-upright member attachment. The load cell can be connected to any well known display. When the load cell and display are calibrated, the tensile load on the cable can be displayed directly. The mounting support and upright member can be rotated about the base plate such that the resultant force from the applied cable tension is aligned with the load cell. The base plate is firmly fixed to any suitable foundation.

Although the present invention has been described relative to a specific embodiment thereof, it is not so limited. The shapes and sizes of the described elements can be modified to suit the size of cable being tested and the space limitations of test area. The clamping of the mounting support to the base as described in the preferred embodiment can be modified by eliminating the clamp and providing threaded bolt holes at fixed locations within the base. In this arrangement, the mounting support does not extend beyond the base and the bolts used to attach the clamp are threaded directly to the base. However, the angular placement of the mounting support about the base is limited to the placement of the threaded bolt holes provided. Further, any well known pin type connection can be used in lieu of the joint configuration shown in FIGS. 1, 3a and 3b. Similarly, the connection of the collar to the upright can be modified from-the bolted connection described.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A load monitor sheave assembly for measuring a tensile load on a cable, the assembly comprising:

a sheave, the cable being wrapped thereon;

an axle having a first end rotatingly supporting the sheave;

a rod having a supporting end cantileveredly supporting the axle at a second end of the axle remote from the first end;

a mounting supporting the rod at two spaced apart points on the rod distant from the supporting end; and a load cell located at a first one point of the two spaced apart points, the load cell measuring strain at the first one point, the strain induced by the tensile load on the cable, the strain corresponding to the tensile load on the cable.

2. The load monitor sheave assembly of claim 1 wherein the rod further comprises:

a threaded portion remote from the axle; and a sleeve receiving the threaded portion, the threaded portion engaging threads within the sleeve, the engagement of the threaded portion in the threads serving to adjust a distance between the sheave and the two spaced apart points.

3. The load monitor sheave assembly of claim 1 further comprising:

an upright member portion of the mounting extending adjacent the rod;

a collar slidably surrounding the rod at the first one point; and an attachment member affixing the collar to the upright member portion for transferring a load corresponding to the tensile load on the cable from the rod to the upright member portion, the load cell being located on the attachment member.

4. The load monitor sheave assembly of claim 1 wherein the load cell is aligned with a direction of the tensile load by a rotation of the mounting about a longitudinal axis of the rod.

5. The load monitor sheave assembly of claim 1 further comprising:

a first plate fixed to the second end of the axle, the first plate having a surface coincident with a longitudinal axis of the axle; and a mating plate fixed to the supporting end of the rod, the mating plate having a mating surface coincident with a longitudinal axis of the rod, the first plate being connected to the mating plate such that the first plate surface and the mating surface are coplanar and the rotation of the first plate about an axis perpendicular to the first surface and passing through an intersection point of the longitudinal axis of the axle and the longitudinal axis of the rod is adjustable.

6. The load monitor sheave of claim 5 further comprising:

a first connecting pin passing through the first plate and the mating plate at the intersection point; and two or more additional connecting pins equally spaced from the first connecting pin and passing through the mating plate and slots in the first plate, the slots accommodating the rotation of the first plate, the first and additional connecting pins being tightened to prevent rotation of the first plate.

7. The load monitor sheave assembly of claim 1 wherein the mounting further comprises:

a base supporting the rod at a second one point of the two spaced apart points; and a rotating member rotatably attached to the base at a point coincident with a longitudinal axis of the rod, a rotation of the rotating member about the longitudinal axis serving to align the load cell with a direction of the tensile load.

8. The load monitor sheave of claim 7 wherein the rotating member further comprises a clamp, the clamp being tightened against the base to prevent rotation of the rotating member.

9. The load monitor sheave assembly of claim 2 further comprising:

an upright member portion of the mounting extending adjacent the rod;

a collar slidably surrounding the rod at the first one point; and an attachment member affixing the collar to the upright member portion for transferring a load corresponding to the tensile load on the cable from the rod to the upright member portion, the load cell being located on the attachment member.

10. The load monitor sheave assembly of claim 9 further comprising:

a first plate fixed to the second end of the axle, the first plate having a surface coincident with a longitudinal axis of the axle; and a mating plate fixed to the supporting end of the rod, the mating plate having a mating surface coincident with a longitudinal axis of the rod, the first plate being connected to the mating plate such that the first plate surface and the mating surface are coplanar and the rotation of the first plate about an axis perpendicular to the first surface and passing through an intersection point of the longitudinal axis of the axle and the longitudinal axis of the rod is adjustable.

11. The load monitor sheave of claim 10 further comprising:

a first connecting pin passing through the first plate and the mating plate at the intersection point; and two or more additional connecting pins equally spaced from the first bolt connecting pin passing through the mating plate and slots in the first plate, the slots accommodating the rotation of the first plate, the first and additional connecting pins being tightened to prevent rotation of the first plate.

12. The load monitor sheave assembly of claim 10 wherein the mounting further comprises a base supporting the rod at a second one point of the two spaced apart points, the upright member being rotatbly attached to the base at a point coincident with a longitudinal axis of the rod, a rotation of the upright member about the longitudinal axis serving to align the load cell with a direction of the tensile load.

13. The load monitor sheave of claim 12 wherein the upright member further comprises a clamp, the clamp being tightened against the base to prevent rotation of the upright member.

* * * * *